July 27, 1965 M. R. FORRESTER ETAL 3,196,689
BREATH CONSTITUENT MEASUREMENT APPARATUS AND METHOD
Filed April 18, 1963 2 Sheets-Sheet 1
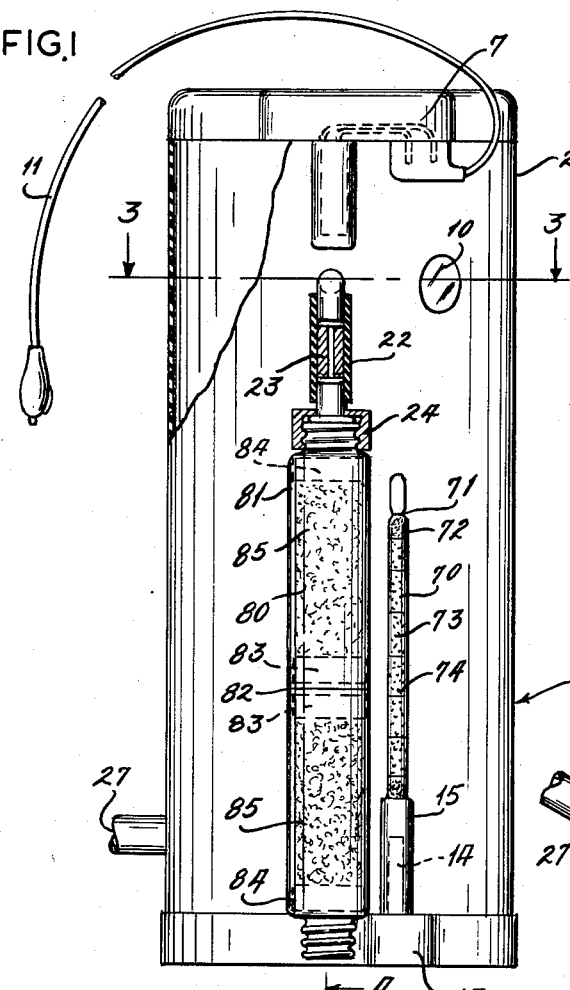
FIG.1
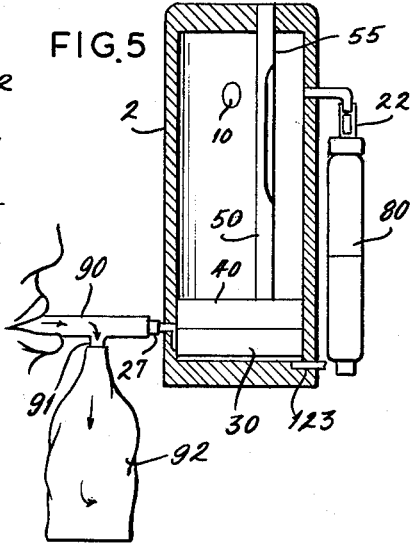
FIG.5
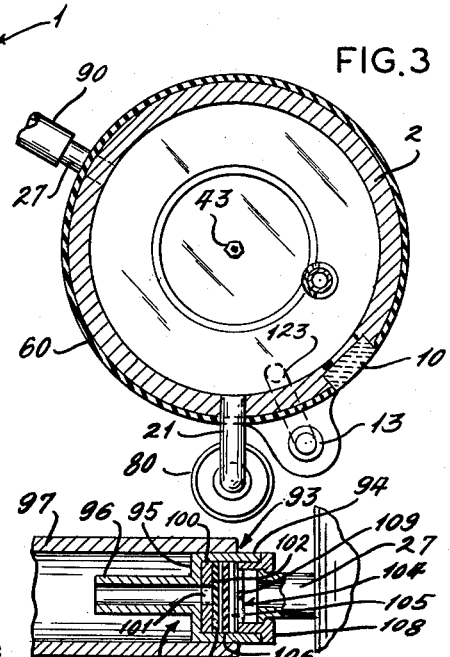
FIG.3
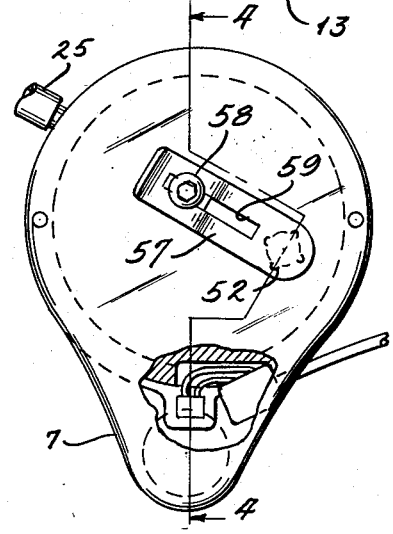
FIG.2
FIG.11
INVENTORS:
MACQUORN R. FORRESTER
GLENN CLIFFORD FORRESTER
BY
ATTORNEY July 27, 1965 M. R. FORRESTER ETAL 3,196,689
BREATH CONSTITUENT MEASUREMENT APPARATUS AND METHOD
Filed April 18, 1963 2 Sheets-Sheet 2
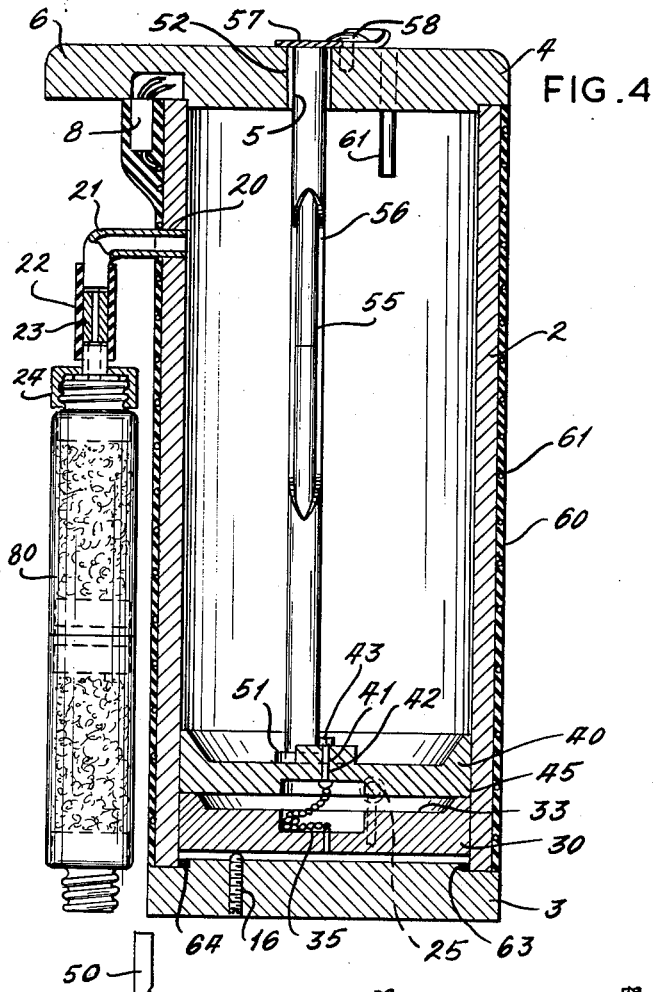
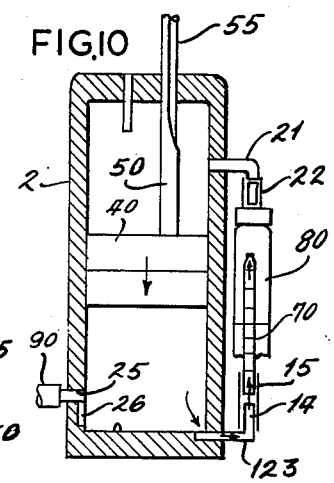
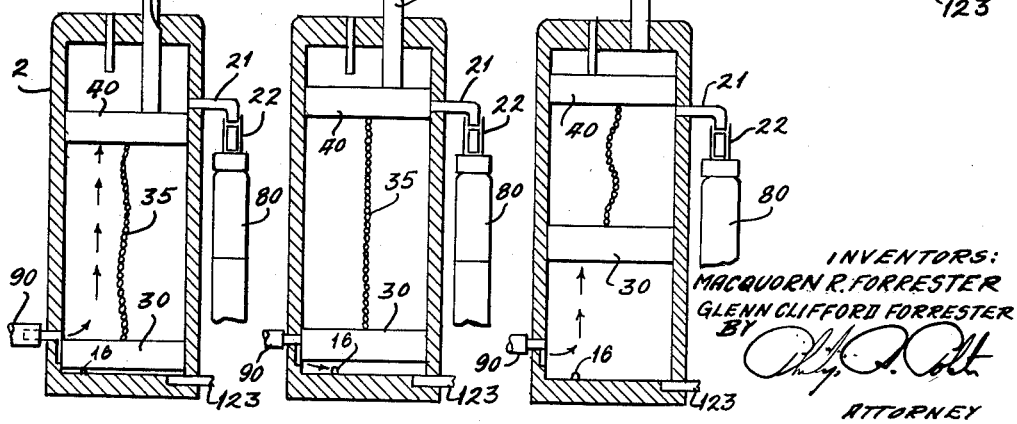
INVENTORS:
MACQUORN R. FORRESTER
GLENN CLIFFORD FORRESTER
BY
ATTORNEY es # United States Patent Office 3,196,689
Patented July 27, 1965

3,196,689
BREATH CONSTITUENT MEASUREMENT APPARATUS AND METHOD
Macquorn R. Forrester, 900 Crescent Drive, Clayton, Mo., and Glenn C. Forrester, Niagara Falls, N.Y.; said Glenn C. Forrester assignor to said Macquorn R. Forrester
Filed Apr. 18, 1963, Ser. No. 273,911
15 Claims. (Cl. 73—421.5)

This invention relates to apparatus and method for use in measuring constituents of human breath. It has particular application to and is described as applied to the measurement of the alcohol content of human alveolar breath, but its use it not confined thereto. For example, the apparatus and method might be used to detect and measure the content of ethyl acetate, acetone, radioactive substances and the like.

As has been indicated above, the illustrative apparatus and method of this invention are described as applied to the measurement of alcohol. Law enforcement agencies and the public have become increasingly aware of the danger presented by the intoxicated driver. Studies have shown that the incidence of accidents bears a marked relation to the presence of alcohol in the blood. It is apparent, therefore, that it is desirable to arrest and convict drunken drivers, to discourage driving while under the influence of alcohol. Law enforcement agencies use pre-prepared objective symptom forms, have defined "under the influence" in terms of blood-alcohol percentages, and in general have tried to compile a comprehensive picture of the circumstances surrounding a given case. This is necessary, because in spite of what would appear the obvious public interest in discouraging drunken driving, convictions in such cases are difficult to obtain. This may be because the charge is made a felony by law, and that juries are reluctant to impose such a severe penalty, or because the members of a jury are sympathetic with the problem of driving home after an evening of social drinking, or, because of a weakness in the evidence. In respect of the latter, it may be shown, for example, that the symptoms (staggering, incoherence, etc.) described by the arresting officer, may equally be attributable to some organic disorder or disease, such as brain injury, heart condition, diabetes, uremia or the like, or to some other source, such as overdoses of barbital, paraldehyde or some drug being used for the treatment of some condition of the person exhibiting the symptoms.

For these reasons, law enforcement agencies are always interested in building stronger cases with better evidence. Blood sampling is, of course, a direct and effective method, but it is not practical as a field testing procedure, and would appear to offer legal difficulties if the person refused, even in the police station or hospital, to submit to sampling. Breath sampling simplifies field operation, is painless and relatively easy to obtain.

Various breath tests have been developed. The advantage of such breath tests, particularly field devices, has been that the sample may be obtained immediately after an arrest. It is quite evident that the blood-alcohol content can build up or decrease with time depending upon the subject's drinking history. Thus, if the subject's body has absorbed into the blood stream all of the free alcohol consumed, the blood-alcohol content will decrease between the time of the arrest and the time a test can be made at some remote hospital or police station, whereas, if the subject has only recently begun to drink, so that little of the free alcohol has been absorbed into the blood stream, the blood-alcohol content will increase in the same period. In any event, the results obtained at a testing center, may not reflect accurately the condition at time of arrest.

The accuracy of field devices used heretofore has been questioned because the volume of alveolar breath delivered to the device has not been exactly delimited. The volume of alveolar breath delivered to the preserved sample in one field testing device is determined from the carbon dioxide contained in the sample used.

One of the objects of this invention is to provide apparatus and method for collecting alveolar breath at the time of an arrest, in such a way that exactly known volumes of breath are delivered to reagents in a "field vial" and to reagents in a "laboratory vial."

Another object is to provide such a device which is readily portable, simple to use, operative under any ambient temperature conditions, rugged, accurate, and fair to the subject.

Other objects will become apparent to those skilled in the art in the light of the following description and accompanying drawings.

In the drawing:
FIGURE 1 is a view in side elevation, partly broken away, of one embodiment of the device of this invention;
FIGURE 2 is a top plan view, partly broken away, of the device shown in FIGURE 1;
FIGURE 3 is a sectional view taken along the line 3—3 of FIGURE 1;
FIGURE 4 is a sectional view taken along the line 4—4 of FIGURE 2;
FIGURE 5 is a somewhat diagrammatic longitudinal sectional view of a device of this invention, with a fragmentary view in side elevation of certain necessary attachments to the device, in use, showing the first step in the method of operation of the device;
FIGURES 6, 7, 8, 9 and 10 are somewhat diagrammatic fragmentary sectional views, corresponding to the view in FIGURE 5, showing successive steps in the method of operation of the device; and
FIGURE 11 is a fragmentary longitudinal sectional view through a part of one embodiment of mouthpiece assembly, showing parts of one embodiment of check valve and spit trap.

In accordance with this invention, generally stated, a human breath constituent measuring device is provided which includes a cylinder containing two pistons slidably mounted in the cylinder for movement relative to the cylinder and to one another. The pistons are biased to a normal position in the bottom of the cylinder. The pistons in the cylinder are so constructed that breath from an inlet port near the bottom of the cylinder is directed between the pistons so as to move the upper of the pistons away from the lower one. When the upper piston has moved an exactly known distance away from the lower piston, the passage of breath between the pistons is blocked and the breath is directed below the lower piston, causing it to move in a direction toward the upper piston. This provides an exactly known volume of breath between the two pistons. This breath is then delivered, using the force of incoming breath, to the reagents in a "laboratory vial." After the exactly predetermined amount of breath has been delivered to the laboratory vial, the ingress of breath is blocked, providing an exactly known volume of breath below the lower piston. This breath is then directed through a field vial, through which it is forced by the bias of the pistons toward the normal position, until the exactly predetermined amount of breath is delivered to the reagents in the field vial.

In the preferred embodiment, the means for directing the air first to the space between the pistons, and then to the space below the lower piston are channels, and the selective blocking of inlet and outlet ports is accomplished in part by the pistons themselves. In this embodiment, the pistons are connected, as by a flexible link (chain, cable, cord or the like) which is inelastic for all practical purposes under the conditions imposed upon it between the pistons. Also, as has been indicated above, the preferred arrangement is with upper and lower pistons, gravity biased, since this is the simplest and most effective arrangement.

In the preferred embodiment, a heating jacket is supplied, the use of which ensures uniform results by ensuring a constant elevated temperature, hence constant volume, and precluding condensation of alcohol vapor, water vapor, or both, which also ensures trouble free operation even in cold weather. A rod, slidably mounted in the top cover of the cylinder, with its lower end resting on the top of the upper piston, serves the fourfold function of providing a ready way of initiating the admission of breath to the cylinder, indicating the operation of the pistons within the cylinder, securing the pistons against unwanted movement when the device is not in use, and housing a thermometer.

In accordance with the method of this invention, the breath of the subject to be tested is used to form a charge of air of known volume; continued blowing forms a second charge while forcing the first charge through a preserved sample in a laboratory vial; and subsequently the blowing of the subject is stopped, and the second charge, the volume of which is precisely predetermined, is forced through a field vial. In the preferred embodiment, a portion of the initial breath of the subject when taking the test is wasted, either to the atmosphere, or preferably by directing it into a waste bag or other measuring device, so as to make more certain that pure alveolar air is introduced to the cylinder to form the measured charges.

Referring now to the drawing for one illustrative embodiment of this invention, reference numeral 1 indicates a portable alcohol measuring device. The device 1 includes a stainless steel cylinder 2 with a base 3 fitted in airtight engagement to the lower end of the cylinder, and a top 4 slip-fitted to the upper end of the cylinder. In the embodiment shown, an O-ring 64 seated in a channel 63 defined by an annular shoulder on the base 3 and the inside wall of the cylinder 2 serves to seal the base-cylinder joint, as shown in FIGURE 4. The surface of the inside wall of the cylinder 2 is finely finished. Slidably mounted in the cylinder 2 are a lower piston 30 and an upper piston 40. The circumferential surfaces of the pistons 30 and 40 are also finely finished, and the pistons are so fitted in the cylinder that the pistons and the cylinder inside wall form an airtight fit within the range of pressures and times required of a test. In this embodiment, an adjusting screw 16 is threadedly mounted in the base and an adjustable stop 61 is threadedly mounted in the top.

A rod 50 is slidably journaled in a passage 5 in the top 4. The passage 5 is not entirely complementary to the rod, so as to provide space for flow of air. In the embodiment shown, see FIGURE 4, the incongruence takes the form of lobal passages 52. The lower end of the rod 50, which is provided with a foot 51, rests upon a top surface of the upper piston 40. The foot 51, which may be integral with the rod 50, is in the form of a flange large enough to prevent withdrawal of the rod through the hole 5.

An inlet port 25 extends radially through the wall of the cylinder 2, and communicates with the interior of the cylinder 2 at a place between the lower piston 30 and upper piston 40 when the pistons are in the position shown in FIGURES 4 and 5. In this embodiment, the inlet port 25 also communicates with an axially downwardly extending channel 26 in the inner wall of the cylinder 2, which extends to a point slightly above the bottom of the lower piston 30. An inlet pipe 27 is secured in the port 25.

The wall of the cylinder 2 is provided with an upper outlet port 20, in which is secured an L-shaped fitting 21, on the downwardly extending leg of which is a resilient connector 22. The connector 22 contains, intermediate its ends, a capillary tube 23, the function of which is to reduce, and within limits, regulate, the rate of flow of air in one stage of the operation of the device. On its outer end, the connector 22 has an internally threaded cap 24. In the embodiment shown, the cap is revolvably mounted on a flanged nipple mounting the end of the connecter 22.

The base 3 has integral with it a radially projecting ear 13. A lower outlet port 123 in the base 3 communicates through the upper surface of the base with the interior of the cylinder, at one end, and, at its other end, with a pipe 14, rigidly mounted in the ear 13. A resilient connector 15 is mounted on the pipe 14.

A heating jacket 60, with electric resistance wires 61 in it, surrounds the cylinder 2.

A boss 6 integral with the top 4, projects radially from the cylinder. The boss 6 performs several functions. It supplies a mounting place for a plug-in electrical connection 7, and serves to protect a thermostatic element 8 and the fitting 21. The thermostatic element 8 is electrically connected to the resistance wires 61. An electric cord 11 plugs into the connection 7 and to any suitable source of current. It may, for example, be adapted with a suitable converter to plug into the cigarette lighter of an automobile, or, without a converter, into an ordinary house current receptacle.

Referring now to FIGURE 4, the lower piston 30 and the upper piston 40 are connected by a flexible link 35, which, in the embodiment shown, consists of a bead chain. The bead chain 35 is connected to the lower piston 30 by means of an eye threaded into a tapped hole in the center of the piston, and to the upper piston 40 by means of an eye 41 with a threaded shank taking into a tapped hole 42, and projecting therebeyond. A nut 43 is threaded onto the projecting end of the shank of the eye 41. In this way, adjustment of the eye in a direction toward or away from the lower piston 30 can be accomplished, which, in effect, lengthens (or shortens) the chain, regulating the limiting distance between the pistons as the upper piston moves away from the lower piston. The upper surface of the lower piston 30 is dished to form a flexible link-receiving well 33. The upper piston is partly cut away to make it lighter.

The rod 50 is provided with a thermometer 55, housed within the rod, which is cut away to form a window 56 which serves the function of relief for the air and observation port for the thermometer. Preferably, the rod 50 is hollow at least above the thermometer 55 and filled above the thermometer with a heat-insulating material which projects slightly above the wall of the rod at its top, to provide a heat insulated finger-rest. However, this insulation of the top of the rod can be accomplished in any number of ways. A sliding clamp 57, mounted by means of a square shanked post 58 extending through a slot 59 in the clamp, is slightly bowed so as to provide a frictional engagement with the top. One end of the clamp is positioned to be moved selectively over and clear of the hole 5, so as to hold the rod 50 in the position shown in FIGURE 4, when the device is not in use.

A field vial 70 is mounted on the outlet pipe 14, by slipping one end into the resilient connector 15. A laboratory vial 80 is mounted on the fitting 21 by screwing it into the cap 24, both as shown in FIGURE 1. The vials 70 and 80 consist of tubes which contain chemical reagents which react to the presence of and absorb alcohol, respectively. Such reagents are well known to the art, and their use per se forms no part of this invention.

The field vial 70 consists of a thin tube which, initially, is sealed, with a break line 71 at each end. Immediately next to the break line 71 is a reagent-retaining, porous mass, such as stainless steel mesh 72, between which, through the length of the tube, is a reagent 73, which has the property of indicating the presence of alcohol by a change of color. Such a reagent may be chromated silica gel, for example. The tube itself is graduated along its length with easily visible annular marks 74. When the vial 70 is first mounted in the connector 15, one end is broken off at break line 71, and the open end is inserted in the connector 15.

The laboratory vial 80, in the illustration, consists of a tube 81, which is provided at each end with an externally threaded neck, on which caps, not here shown, are screwed down tight to form an airtight seal. The tube 81 is provided with a break line 82 at its center. On either side of the break line 82, within the tube, is a porous plug 83 of chemically inert material, such as glass wool. Each of the porous plugs 83 is snugly fitted in the tube, so that when the tube is broken in half along the break line 82, the plugs remain in place. Similar plugs 84 are provided inside the tube immediately beyond the threaded neck portion. Between the plugs 83 and 84 in each end of the tube, is absorbent 85. The absorbent 85 in both ends of the tube is identical, taken from the same batch. The amount of absorbent in the end of the tube 81 which is attached directly to the connector 22 is sufficient to absorb all of the constituents to which the test is directed. The absorbent 85 in the other end of the tube, therefore, serves as a blank or standard against which the absorbent in the end which has absorbed the breath constituents can be checked. A suitable absorbent may be anhydrous magnesium perchlorate, for example.

A disposable mouthpiece assembly 90 is adapted to be mounted on the nipple 27. The mouthpiece assembly 90 has a T-stem 91 on which a waste bag 92 is mounted. Preferably, the waste bag 92 is inflatable but inelastic, and can be made of polyethylene, Vinylite or the like, or even paper. The mouthpiece assembly has in it, between the T-stem 91 and the nipple 27, a check valve 93, which permits passage of air into but not out of the cylinder.

In the embodiment shown, the check valve 93 includes a somewhat resilient plastic cylindrical body 94 with a wall 95 and an integral central open ended pipe 96 projecting axially from the wall 95. The pipe 96 can be used as a connecting nipple, but in the preferred embodiment shown, a tube 97 is mounted on the outside of the body 94, and the projecting pipe 96, spaced radially from the inner wall of the tube 97, defines, with the wall, a spit trap 98.

Inside the body 94, a toroidal, axially thin, washer-like magnet 100 is securely mounted airtightly against the valve body wall 95, with an aperture 101 coextensive with the aperture defined by the open end of the pipe 96. The free, radial face 102 of the magnet 100, in this embodiment, is finished flat to form a seat for a flat valve disk 103 of thin plastic, plastic-impregnated cloth, or other airtight material which can seat against the face 102 of the magnet and block the passage of air in a direction toward the pipe 96 from the cylinder 2.

A keeper 104, in the form of a magnetic metal disk 105 faced on the side toward the valve disk 103 with a non-magnetic spacer 106, is positioned on the side of the valve disk 103 away from the magnet 101. The keeper 104 performs several functions. It holds the valve disk 103 in position until blowing is started. It snaps back in response to back pressure from the cylinder, and it ensures a tight seal against escape of air from the cylinder after it has snapped back.

The body 94 of the valve, in the embodiment shown, terminates in a flexible rim, which forms an airtight seal with a cage plug 108.

The cage plug 108 fits in airtight engagement with the rim and inside wall of the cylindrical body 94. The plug 108 has a spider 109 to hold the various components within the body 94 while permitting air to flow freely in both directions. The plug also has an inwardly extending annular bead which pops onto the nipple 27 and forms an airtight seal therewith, which serves as a quick and easy connect and disconnect arrangement of mouthpiece assembly and cylinder 2.

In the embodiment shown, a window 10 is provided in the side wall of the cylinder 2, at the level, axially, of, and circumferentially to one side of upper outlet port 20.

In operation, normally, the heating element will be connected to a source of electric current until the temperature inside the cylinder, as indicated by the thermometer 55 in the rod 50, is at the desired level, for example 110° C. The clamp 57 has been moved away from the hole 5, so as to permit the rod 50 to slide out, upon inversion of the cylinder, so that the temperature can be read. The cylinder is then inverted long enough to permit the pistons to slide to the far end of the cylinder, and restored upright to permit them to slide to the bottom, to flush the cylinder 2. Mouthpiece assembly 90 with its attached waste bag 92 is then mounted on the nipple 27. The end caps are removed from a laboratory vial 80, and one of the threaded ends is mounted in the connector 22. One end of a field vial 70 is broken off and the vial, with the other end intact, is mounted in airtight relation, in the resilient connector 15.

The person giving the test holds the end of the rod 50 down with his finger. The subject then begins to blow through the mouthpiece 90. The spacer 106 is made just thick enough to permit the ready dislodgment of the keeper 104 in response to normal blowing pressures. However, since there is no place for breath to go in the cylinder, as long as the pistons are held down, the keeper will normally not be dislodged. When the waste bag 92 is about filled, the tester releases the rod 50, whereupon with continued blowing, the keeper is dislodged and breath is admitted between the upper and lower pistons. The upper piston, in response to the blowing of the subject, moves upwardly, away from the lower piston, raising the rod 50 and giving a visual indication that the device is operating and the subject blowing. The initial condition is illustrated in FIGURE 5, the second condition, by FIGURE 6. It will be observed that, until the flexible link 35 has become taut, passage of breath below the lower piston 30 is prevented by the blocking, by the lower piston itself, of communication between the passage 26 and the underside of the lower piston. However, it can be seen that the area of the circumferential surface of the lower piston which blocks the passage 26 is very small as compared with the surface area of either piston contiguous the ungrooved part of the wall of the cylinder, so that there will be a small amount of intentional (preferential) leakage, through the passage 26 when the pressure of air in the cylinder becomes great enough. Until the upper piston has reached the initial limit of its travel as determined by the length of flexible link 35, the pressure of breath will act only to move the upper piston. When the flexible link 35 has become taut, continued blowing can cause no further movement of the upper piston since the pressure in the chamber between the two pistons acts against both, but the small intentional leakage through the passage 26 which then begins, permits air to get under the lower piston and cause it to rise. The lower piston then blocks access of breath to the space between the pistons and at the same time further unblocks the passage 26, compelling the breath to be directed below the lower piston. Passage of the breath through the lower outlet 23 is prevented by the presence of the sealed field vial 70. Accordingly, continued blowing causes the lower piston to rise. It will be observed from FIGURE 7, that at this point the upper piston blocks the upper outlet port 20. As the lower piston rises, however, the compression of the breath in the space between the pistons causes the upper piston to rise sufficiently to clear the upper outlet port 20 and to come to rest against the stop 61, permitting the breath between the pistons to be forced out through the outlet port 20, fitting 21 and tube 81, by way of the absorbent 85. As has been explained heretofore, the amount of absorbent 85 in the upper part of the tube 81 is such as to remove all of the constituent for which the test is being made.

Blowing is continued, until the lower piston reaches and makes contact with the upper piston. This condition is signalled by an audible click, and may be confirmed visually through the window 10. No more breath will be admitted to the cylinder, because the lower piston has reached the upper limit of its travel, and all outlets are blocked to breath below the lower piston.

At this point, the tester causes the subject to stop blowing into the cylinder. The back pressure in the cylinder causes the valve disk 103 and keeper 104 to move against the magnet face 102 and valve disk respectively, to block flow of breath from the cylinder through the mouthpiece and the attraction of the magnet for the keeper disk 105 ensures a positive seal. The tester then breaks off the top of the field vial 70, at the break line 71, which permits the breath in the cylinder below the lower piston to be forced, by the gravity bias of the pistons, through the field vial 70.

The presence of alcohol in the breath will be indicated by a change of color of the reactant in the vial 70, and the amount of alcohol will be indicated with a reasonable degree of accuracy by the distance from the lower end of the tube through which the change of color occurs. The graduations 74 provide a simple means of estimating the amount of alcohol. When the pistons have reached the bottom, as indicated by the disappearance of the end of the rod 50, the laboratory vial 80 is removed from the connector 22, recapped tightly, labeled for identification, and preserved for analysis if it is required as evidence.

It can be seen that the amounts of breath in the space between the pistons and between the lower piston and the bottom of the cylinder can be predetermined exactly, by actual measurement. Ordinarily, it is desirable to make these volumes identical, and relative adjustment of the volumes can be made by lengthening or shortening the flexible link 35. However, it may be desirable to have different amounts of breath for the samples. In any event, the exact volume will be known.

It will be observed that, in the arrangement of the preferred embodiment, the first increment of breath beyond that which is wasted is the one which is forced through the laboratory vial, while the second increment, which is more likely to be pure alveolar breath, is forced through the field vial. While most of the mouth and throat breath will have been wasted, so that for all practical purposes, there is almost pure alveolar breath in both charges, the subject is given the benefit, for evidentiary purposes, of any doubt.

Merely by way of example and not by way of limitation it has been found that breath charges of two hundred ten milliliters are satisfactory, so that the cylinder and pistons can be proportioned to provide this volume. The weight of the pistons can be such as to require two to three ounces per square inch above atmospheric pressure to raise them. When anhydrous magnesium perchlorate is used as the absorbent in the laboratory vial 80, the capillary tube 23 need have a bore of diameter and length such as to ensure that the forcing of the charge through it requires at least three seconds, since the absorbent requires only about two seconds to accomplish total absorption of the alcohol vapor in the 210 cc. sample.

Chromated silica gel, on the other hand, requires a matter of minutes to react completely. Therefore, it is desirable to make the outlet port 64 or the field vial itself in such a way as to require two and a half to ten minutes, with these reagents, for the breath sample to pass through. Of course, the cylinder can be set down somewhere while the weight of the pistons forces the lower charge through the field vial.

Numerous variations in the construction of the apparatus of this invention, within the scope of the appended claims will occur to those skilled in the art in the light of the foregoing disclosure. For example, the clamp 57 may take various forms, and the rod 50 may project so as to permit its being grasped and raised to check the temperature, without inverting the container. The set screw 16, by which the height of the lower piston from the bottom of the cylinder may be adjusted (and thereby the rate of leakage from channel 26 controlled), may be replaced by some other means for providing a space, such as a knob on the underside of the piston 30 or the upper surface of the base 3. Other forms of heating jacket, coupling means for the vials, types of vials and the like can be provided. The field vial may be mounted where the laboratory vial is now, and vice versa. Other means for providing adjustment of the length of the flexible link 35 may be used. The pistons might be spring biased or gas biased as distinguished from gravity biased, although the gravity biased arrangements have several advantages, including simplicity. These variations are merely illustrative of those which will occur to those skilled in the art.

Having thus described the invention, what is claimed and desired to be secured by Letters Patent is:

1. A human breath-constituent measuring device comprising a cylinder, first and second pistons relatively movable within said cylinder, means initially operative to direct breath into a space between said pistons to move said first piston away from said second piston, means limiting said separating movement to define at the limit a known predetermined volume of breath between said pistons, means, operative in response to the reaching of said limit to direct breath to the far side of the second piston, away from said first piston, whereby said breath is caused to move said second piston toward said first piston, and means limiting the movement of said second piston to a position at which the volume of breath on said far side of said second piston has reached an accurately predetermined desired amount whereby two samples of breath of accurately known volume are made available.

2. A human breath-constituent measuring device comprising a cylinder, upper and lower pistons slidably mounted in said cylinder for movement relative to one another, connector means connected to and extending between said pistons, said cylinder having a breath receiving inlet, said breath receiving inlet communicating with the interior of the cylinder between the upper and lower pistons when said pistons are in their normal position at the bottom of said cylinder, a part of said cylinder wall and the lower piston defining between them a channel communicating with said cylinder below said lower piston and closely restricted in its communication with the breath receiving inlet by said lower piston in the said normal position of said piston, and opened when said lower piston moves upwardly to block communication of the breath inlet between said pistons, whereby said upper piston is caused to move, by breath coming through said inlet, away from said lower piston until said relative movement of the piston is arrested by said connector means, continued ingress of breath leaking through the channel along the lower piston then serving to move the lower piston to a position at which it blocks communication of the breath receiving inlet between the two pistons and opens communication of the breath receiving inlet below said lower piston, whereby continued blowing causes the lower piston to move toward the upper piston.

3. The device of claim 2 wherein the connector means between said pistons is a flexible but inelastic link.

4. A human breath-constituent measuring device comprising a cylinder, upper and lower pistons slidably mounted in said cylinder for movement relative to said cylinder and to each other and connector means between said pistons, said cylinder having an inlet and upper and lower outlet ports communicating with the interior of said cylinder, said inlet port communicating with said interior between the upper and lower pistons when the said pistons are in their normal position at the bottom of said cylinder, a part of said cylinder wall and the lower piston defining between them a channel communicating with said cylinder below said lower piston and closely restricted in its communication with the breath receiving inlet by said lower piston in its said normal position, and opened when said lower piston moves upwardly to block communication of the breath inlet between said pistons, whereby said upper piston is caused to move by breath coming through said inlet, away from said lower piston until said relative movement of the piston is arrested by said connector means, and continued blowing causes the lower piston to move toward the upper piston, said upper outlet port communicating with the interior of said cylinder at a place above the position of the lower edge of the upper piston when the lower piston first begins to move upwardly, said cylinder being sufficiently long to permit movement of said upper piston, in response to the movement of said lower piston, to uncover said outlet port.

5. The apparatus of claim 4 including a laboratory vial connected to communicate with the upper outlet port.

6. The apparatus of claim 5 including a field vial connected to communicate with said lower outlet port.

7. The apparatus of claim 1 wherein an electrical heating jacket is provided around said cylinder, and electrical connection means are provided for connecting said heating jacket to a suitable source of electricity.

8. The apparatus of claim 1 wherein a rod is provided, slidably mounted in the top of said cylinder, said rod having one end normally engaging the top surface of said upper piston and said rod being of a length to extend from the top of said upper piston to the top of said cylinder when said upper piston is in the position to which it is normally biased.

9. The apparatus of claim 8 including a thermometer housed within the rod.

10. The apparatus of claim 8 wherein clamp means are provided selectively to engage said rod to hold said rod in a piston restraining position.

11. The apparatus of claim 1 wherein a discharge port is provided, opened when the second piston moves toward said first piston, whereby the movement of said second piston forces the breath between the two pistons through said discharge port.

12. The apparatus of claim 1 wherein a field vial discharge port is provided, communicating with the interior of said cylinder on the far side of the second piston relative to the first piston, and a field vial is mounted to stop said port and provided with a frangible end portion whereby the breath on the far side of said second piston will be retained until the frangible end of said tube is removed, whereupon the breath on said far side will be forced through said field vial.

13. The apparatus of claim 12 wherein the field vial includes a transparent tube with graduations spaced along it.

14. A method of sampling human breath comprising the steps, during the course of one exhalation of breath by a subject, of wasting a portion of the first exhaled breath of the subject; thereafter admitting further breath to a container having a moveable partition therein and forming a first charge of breath of predetermined volume on one side of said partition; forcing, with continued exhalation, the said first charge through a vial while simultaneously forming a second charge of breath of predetermined volume on the other side of said partition; and then the steps of cutting off the exhalation to said container and forcing the said second charge through a second vial.

15. The method of claim 14 wherein the first vial is a laboratory vial and the second vial is a field vial.

References Cited by the Examiner
UNITED STATES PATENTS 2,591,691 4/52 Forrester _____ 23—232
2,867,511 1/59 Harger _____ 23—232 X RICHARD C. QUEISSER, *Primary Examiner.*

JOSEPH P. STRIZAK, *Examiner.*